(12) United States Patent  
Khan et al.

(10) Patent No.: US 8,335,159 B2
(45) Date of Patent: Dec. 18, 2012

(54) METHOD AND SYSTEM FOR INTRODUCING FREQUENCY SELECTIVITY INTO TRANSMISSIONS IN AN ORTHOGONAL FREQUENCY DIVISION MULTIPLEXING NETWORK

(75) Inventors: Farooq Khan, Allen, TX (US); Jiann-An Tsai, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 819 days.

(21) Appl. No.: 11/327,799

(22) Filed: Jan. 6, 2006

(65) Prior Publication Data

US 2006/0239180 A1 Oct. 26, 2006

Related U.S. Application Data

(60) Provisional application No. 60/673,574, filed on Apr. 21, 2005, provisional application No. 60/673,674, filed on Apr. 21, 2005.

(51) Int. Cl.
*H04L 12/26* (2006.01)

(52) U.S. Cl. ....................................................... 370/235

(58) Field of Classification Search .................. 370/203, 370/208, 210, 229, 235, 431, 436, 442, 458, 370/464, 478, 480, 498, 238; 455/91, 101–103, 455/127.1, 127.2, 130, 132–133, 136–138, 455/200.1, 230, 232.1, 234.1, 239.1, 242.1, 455/266

See application file for complete search history.

(56) References Cited

U.S. PATENT DOCUMENTS

| | | | |
|---|---|---|---|
| 6,236,363 B1 * | 5/2001 | Robbins et al. | 342/360 |
| 6,842,487 B1 * | 1/2005 | Larsson | 375/260 |
| 2003/0072354 A1 * | 4/2003 | Chang et al. | 375/147 |
| 2004/0014501 A1 * | 1/2004 | Kuwahara et al. | 455/561 |
| 2004/0047284 A1 * | 3/2004 | Eidson | 370/203 |
| 2005/0111424 A1 * | 5/2005 | Tsai et al. | 370/342 |
| 2005/0117660 A1 * | 6/2005 | Vialle et al. | 375/299 |
| 2005/0254592 A1 * | 11/2005 | Naguib et al. | 375/267 |
| 2006/0039273 A1 * | 2/2006 | Gore et al. | 370/208 |
| 2011/0142148 A1 * | 6/2011 | Nakamura | 375/260 |

OTHER PUBLICATIONS

Haynes, Toby, A Primer on Digital Beamforming, Mar. 26, 1998, pp. 6-8.*

* cited by examiner

*Primary Examiner* — Omar Ghowrwal (57) ABSTRACT

A method of introducing frequency selectivity into transmissions in an orthogonal frequency division multiplexing network is provided. The method includes generating a symbol. A plurality of delayed symbols are generated based on the symbol. The delayed symbols are transmitted from multiple transmit antennas. The symbol delay values may be different for different users depending upon the users' channel characteristics.

14 Claims, 10 Drawing Sheets

METHOD AND SYSTEM FOR INTRODUCING FREQUENCY SELECTIVITY INTO TRANSMISSIONS IN AN ORTHOGONAL FREQUENCY DIVISION MULTIPLEXING NETWORK

CROSS-REFERENCE TO RELATED APPLICATION AND CLAIM OF PRIORITY

The present application is related to U.S. Provisional Patent Application No. 60/673,574, entitled "Diversity transmission in an OFDM wireless communication system," filed on Apr. 21, 2005, and to U.S. Provisional Patent Application No. 60/673,674, entitled "Diversity transmission in an OFDM wireless communication system," filed on Apr. 21, 2005. U.S. Provisional Patent Application Nos. 60/673,574 and 60/673,674 are assigned to the assignee of the present application. The subject matter disclosed in U.S. Provisional Patent Application Nos. 60/673,574 and 60/673,674 are hereby incorporated by reference into the present application as if fully set forth herein. The present application hereby claims priority under 35 U.S.C. §119(e) to U.S. Provisional Patent Application Nos. 60/673,574 and 60/673,674.

TECHNICAL FIELD OF THE INVENTION

The present disclosure relates generally to wireless communications and, more specifically, to a method and system for introducing frequency selectivity into transmissions in an orthogonal frequency division multiplexing (OFDM) network.

BACKGROUND OF THE INVENTION

Currently-implemented OFDM networks suffer from lack of frequency-selectivity in channels with flat-fading. Flat-fading occurs when a single path channel exists between the transmitter and the receiver. Moreover, in channels with low delay spread, such as micro-cell outdoor and pico-cell indoor channels, the channels are flat over larger bandwidths due to large coherence bandwidth of these channels. In the absence of any frequency selectivity in some channels, the wireless system is not able to fully exploit the advantages associated with frequency selectivity, such as frequency-diversity for higher speed mobile stations and frequency-selective multi-user scheduling for low-to-medium mobility mobile stations, which severely limits the system performance. Therefore, there is a need in the art for an OFDM network that is able to overcome the disadvantages associated with a lack of frequency selectivity in channels with flat-fading.

SUMMARY OF THE INVENTION

A method for introducing frequency selectivity into transmissions in an orthogonal frequency division multiplexing (OFDM) network is provided. According to an advantageous embodiment of the present disclosure, the method includes generating an OFDM symbol. A plurality of delayed symbols are generated based on the OFDM symbol. A signal is transmitted from two or more transmit antennas based on the delayed OFDM symbols.

According to another embodiment of the present disclosure, a base station capable of introducing frequency selectivity into transmissions in an OFDM network is provided that includes a symbol generator and a multiple delay provider coupled to the symbol generator. The symbol generator is operable to generate a symbol, and the multiple delay provider is operable to generate a plurality of delayed symbols based on the symbol.

According to yet another embodiment of the present disclosure, a subscriber station capable of introducing frequency selectivity into transmissions in an OFDM network is provided that includes a memory. The memory is operable to store a symbol generator and a multiple delay provider. The symbol generator is operable to generate a symbol, and the multiple delay provider is operable to generate a plurality of delayed symbols based on the symbol.

According to yet another embodiment of the present disclosure, the multiple delay provider is operable to generate a plurality of delayed symbols based on the cyclic delays introduced into the symbol.

According to yet another embodiment of the present disclosure, the multiple delay provider is operable to generate a plurality of delayed symbols based on different delay values for different users served by the base station according to the users' channel characteristics.

According to yet another embodiment of the present disclosure, the multiple delay provider is operable to generate a plurality of delayed symbols based on different delay values for different channels transmitted by the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The teaching of the present disclosure is explained in the context of an Orthogonal Frequency Division Multiplexing (OFDM) based wireless communication system. A simplified example of data transmission/reception using OFDM begins with a serial-to-parallel conversion of QAM-modulated symbols, which are input to an Inverse Fast Fourier Transformer (IFFT). At the output of the IFFT, N time-domain samples are obtained. Here N refers to the IFFT/FFT size used by the OFDM system. The signal after IFFT is parallel-to-serial converted and a cyclic prefix is added to the signal sequence. The resulting sequence of samples is referred to as an OFDM symbol. At the receiver, the cyclic prefix is first removed and the signal is serial-to-parallel converted before feeding it into a Fast Fourier Transformer (FFT). The output of the FFT is parallel-to-serial converted and the resulting QAM modulation symbols are input to a QAM demodulator.

Figure 1:
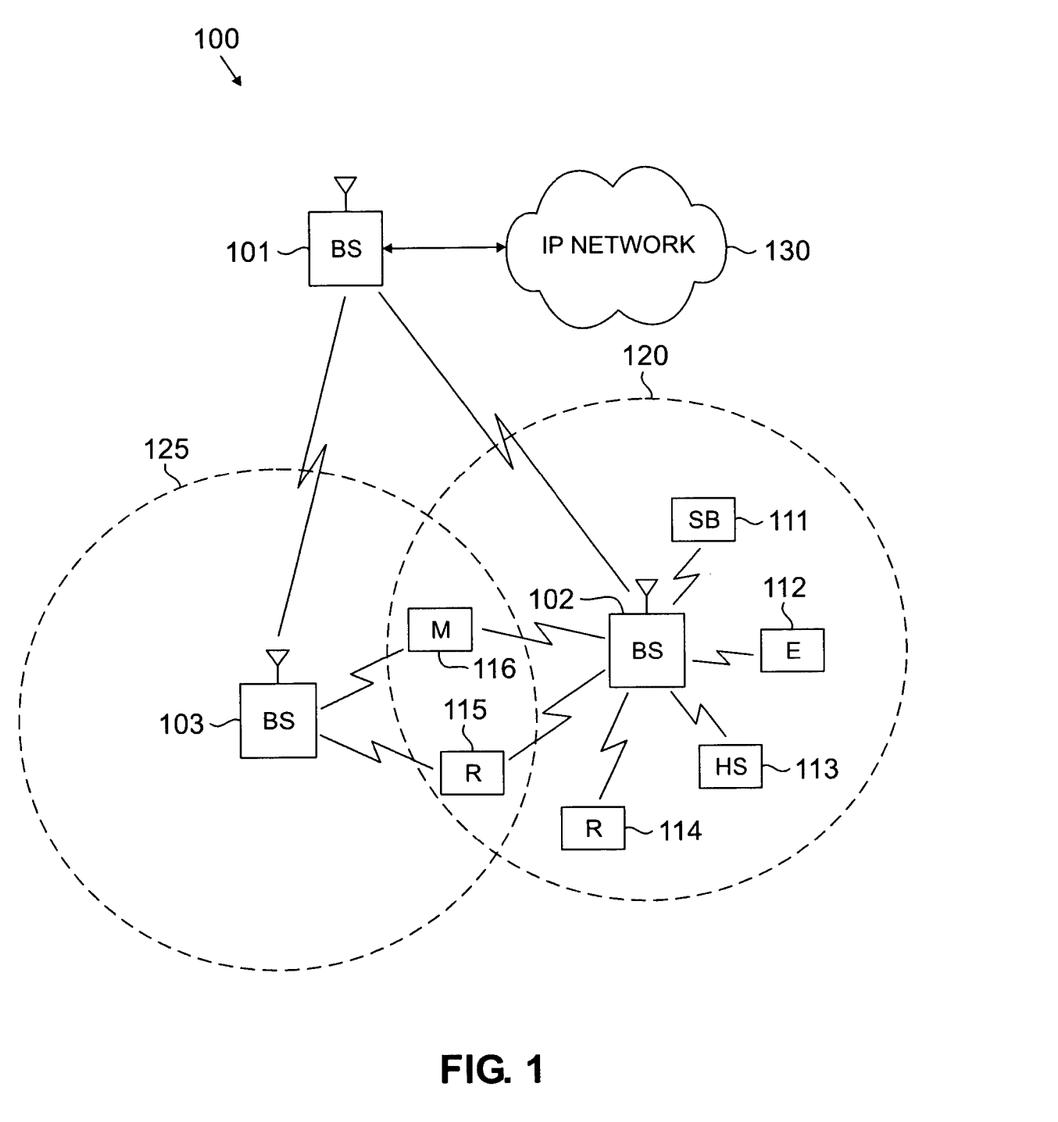
FIG. 1 illustrates an exemplary orthogonal frequency division multiplexing (OFDM) wireless network that is capable of introducing frequency selectivity into transmissions according to an embodiment of the present disclosure.

FIG. 1 illustrates an exemplary OFDM wireless network 100 that is capable of introducing frequency selectivity into transmissions according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16, 802.20, or 802.11 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

In accordance with an embodiment of the present disclosure, each base station 101-103 is operable to introduce frequency selectivity into otherwise flat-fading transmissions from the base station 101-103 by transmitting each OFDM symbol with a different delay from each antenna in an antenna array of the base station 101-103. Thus, the transmitted symbol will arrive at the receiver, such as one of the subscriber stations 111-116, at multiple times as would a symbol received with inherent frequency selectivity.

Similarly, each subscriber station 111-116 is operable to introduce frequency selectivity into otherwise flat-fading transmissions from the subscriber station 111-116 by delaying each OFDM symbol to be transmitted using a plurality of delays and transmitting the delayed symbols from multiple transmit antennas. Thus, the transmitted symbol will arrive at the receiver, such as base station 102, as would a symbol received with inherent frequency selectivity.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

Figure 2:
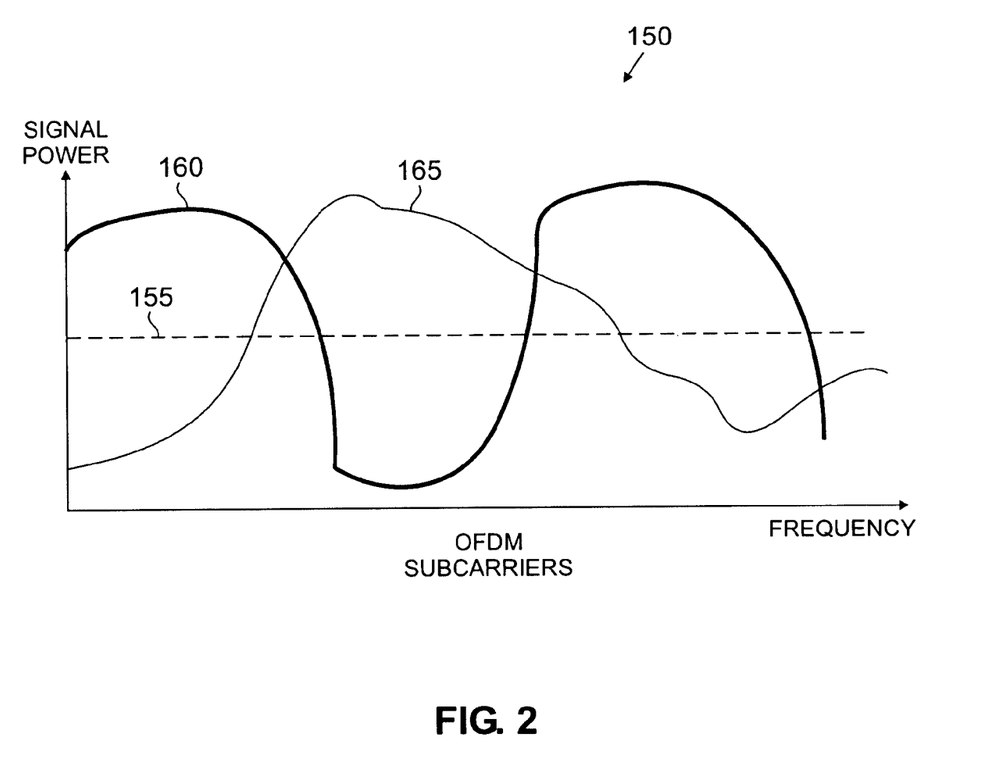
FIG. 2 illustrates a graph of a flat fading channel and two frequency-selective fading channels, which may correspond to channels used for communication between the base stations and subscriber stations of FIG. 1 according to an embodiment of the present disclosure.

FIG. 2 illustrates a graph 150 of a flat fading channel 155 and two frequency-selective fading channels 160 and 165, which may correspond to channels used for communication between base station 102 and subscriber stations 111-116 in wireless network 100. In a communication link, a multi-path channel, such as channel 160 or channel 165, results in frequency-selective fading. Moreover, in a mobile wireless environment, the channel also results in time-varying fading. Therefore, in a wireless mobile system employing OFDM/DFT-Spread OFDM-based access, the overall system performance and efficiency may be improved by using, in addition to time-domain scheduling, frequency-selective multi-user scheduling. The signal quality may be improved relative to a flat fading channel 155 if the subscriber station 111-116 communicating on channel 160 is scheduled at the edge sub-carriers where that subscriber station's 111-116 signal quality is better and the subscriber station 111-116 communicating on channel 165 is scheduled in the middle sub-carriers where that subscriber station's 111-116 signal quality is better. Therefore, if a frequency-selective effect is introduced in the transmitted signal, the capacity and reliability of the wireless channel may be greatly improved.

In a time-varying mobile wireless channel, it is also possible to improve the reliability of the channel by spreading and/or coding the information over the sub-carriers. However, if the channel is flat, frequency diversity cannot be achieved. Therefore, by introducing frequency selectivity via cyclic delay diversity in the transmitted signal, the reliability of the wireless channel can be improved by exploiting the frequency selectivity.

Figure 3A:
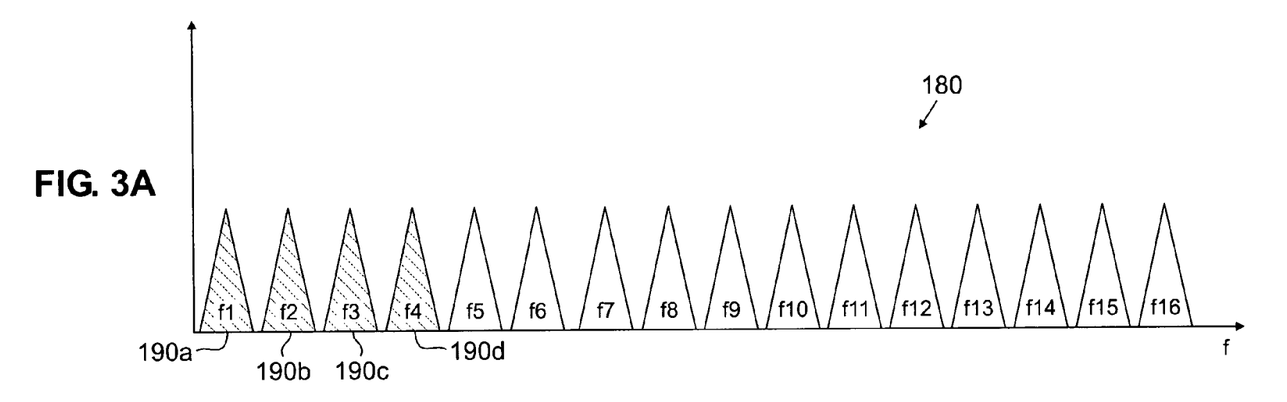
FIGS. 3A-B illustrate sub-carrier allocation for subscriber stations of FIG. 1 according to two embodiments of the present disclosure.
Figure 3B:
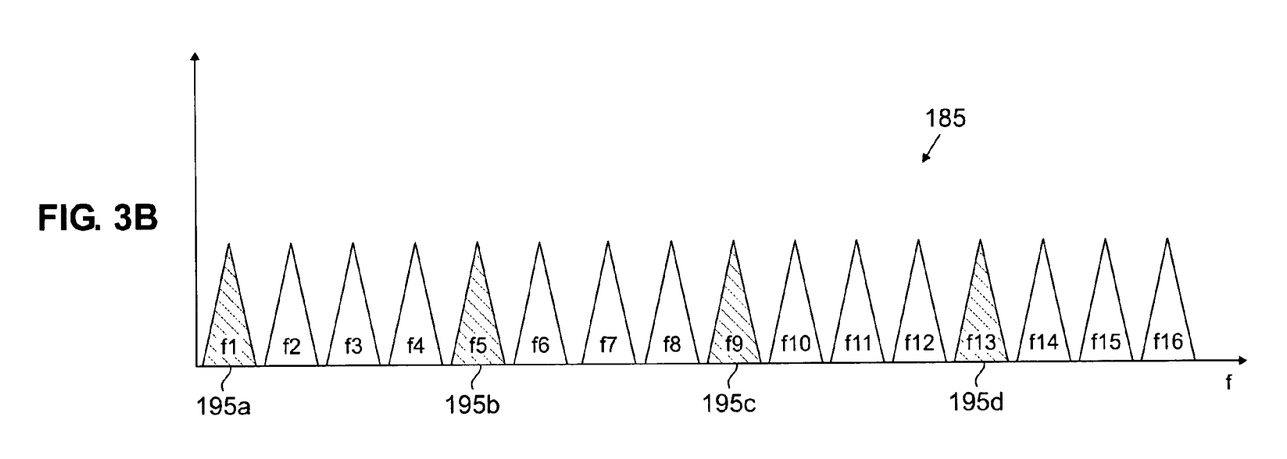

FIG. 3A illustrates sub-carrier allocation for frequency-selective multi-user scheduling 180, and FIG. 3B illustrates sub-carrier allocation for frequency diversity in OFDM 185. In the case of frequency-selective multi-user scheduling 180, a contiguous set of sub-carriers 190a-d potentially experiencing an upfade is allocated for transmission to a user. The total bandwidth is divided into subbands grouping multiple contiguous sub-carriers, as shown in FIG. 3A where sub-carriers $f_1$, $f_2$, $f_3$ and $f_4$ 190a-d are grouped into a subband for transmission to a user in frequency-selective multi-user scheduling mode. However, in the case of frequency-diversity transmission 185, the allocated sub-carriers 195a-d are preferably uniformly distributed over the whole spectrum, as is shown in FIG. 3B.

The frequency-selective multi-user scheduling 180 is generally beneficial for low mobility users for which the channel quality can be tracked. However, the channel quality can generally not be tracked for high mobility users (particularly in a frequency division duplexing system where the fading between the downlink and uplink is independent) due to channel quality feedback delays. Thus, for high mobility users, the frequency diversity transmission mode 185 may be preferred.

In conventional cyclic delay diversity approaches, the same delay value is used for all the users in a cell. A larger delay value is generally chosen to maximize the frequency-diversity benefit. A larger delay value results in a smaller coherence bandwidth and, therefore, makes the fading independent of scattered sub-carriers, as shown in FIG. 3B. However, a delay value optimized for frequency-diversity also results in frequency-selective fading within a subband used for frequency-selective multi-user scheduling 180 affecting the scheduling performance and achievable capacity within a subband. From an information theory point of view, maximum capacity is achieved when fading is flat within a subband. This suggests that the preferred delay value for frequency-selective multi-user scheduling 180 should be as small as possible (i.e., one sample delay), resulting in a larger coherence bandwidth. This will allow wider peaks to appear relative to a flat-fading channel, such as channel 155 in FIG. 2. A larger coherence bandwidth would provide almost flat fading within a subband and hence greater possible capacity. Moreover, if frequency-selectivity within a subband is introduced by a larger delay value optimized for frequency-diversity performance, the subband peak disappears (the sub-carrier gains within the subband are averaged), undermining the performance of frequency-selective multi-user scheduling 180.

Figure 4:
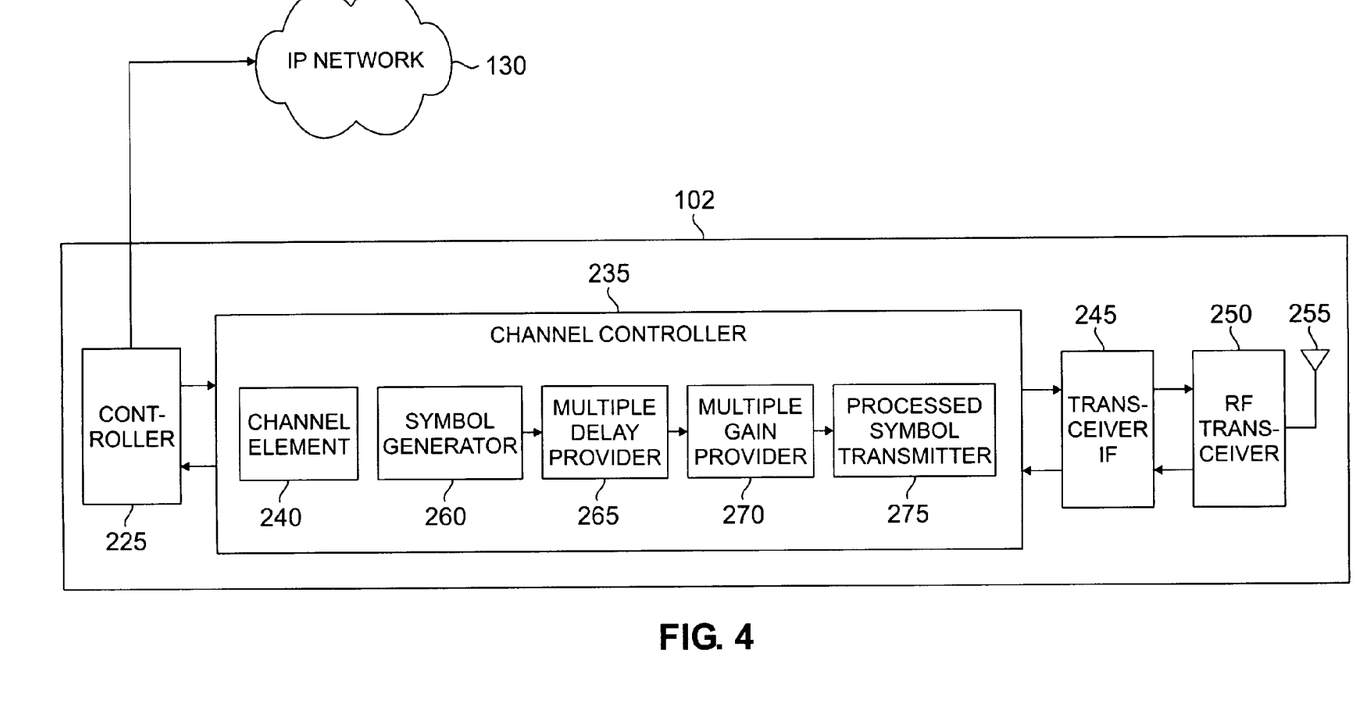
FIG. 4 illustrates an exemplary base station that is capable of introducing frequency selectivity into transmissions according to an embodiment of the present disclosure.

FIG. 4 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In accordance with an embodiment of the present disclosure, channel controller 235 comprises symbol generator 260, multiple delay provider 265, optional multiple gain provider 270, and processed symbol transmitter 275. Although illustrated and described as four separate components, it will be understood that any two or more of symbol generator 260, multiple delay provider 265, multiple gain provider 270, and processed symbol transmitter 275 may be implemented together in a single component without departing from the scope of the present disclosure.

Symbol generator 260 is operable to generate symbols for transmission by base station 102. For a particular embodiment, each symbol comprises an OFDM symbol sequence of N+G samples ($a_0, a_1, \ldots, a_{(N+G-1)}$), with N samples corresponding to the output of an Inverse Fast Fourier Transformer (IFFT) and G samples corresponding to a cyclic prefix for the symbol. Symbol generator 260 is also operable to provide the symbols to multiple delay provider 265.

Multiple delay provider 265 is coupled to symbol generator 260 and is operable to provide a plurality of delays for each symbol generated by symbol generator 260 in order to generate a plurality of delayed symbols based on each symbol. The maximum delay provided by multiple delay provider 265 may be less than the cyclic prefix length in order to avoid inter-symbol interference. Multiple delay provider 265 is also operable to provide the delayed symbols to multiple gain provider 270 or, for the embodiment in which multiple gain provider 270 is omitted, to processed symbol transmitter 275.

As used herein, "delayed symbols" means a plurality of symbols generated from a single symbol, each having a different delay. For one embodiment, one of the delayed symbols may have a delay of essentially zero. For this embodiment, multiple delay provider 265 provides the delayed symbol having a delay of essentially zero directly to multiple gain provider 270, or to processed symbol transmitter 275, without intentionally delaying the symbol.

For one embodiment, multiple delay provider 265 may provide the multiple delays for each symbol by shifting the symbol to be delayed by an integer number of samples. For another embodiment, multiple delay provider 265 may provide the multiple delays for each symbol by shifting the symbol to be delayed by a fraction of a sample delay by over-sampling the symbol by a factor of Q, resulting in a Q times higher sampling rate. An integer number of higher rate sample delay may then be introduced. In this embodiment, each of the higher rate samples will introduce a delay of 1/Qth of the original sample delay.

Multiple gain provider 270 is coupled to multiple delay provider 265 and is operable to provide a plurality of gains, with a different gain for each delayed symbol generated by multiple delay provider 265, in order to generate a plurality of processed symbols. For one embodiment, multiple gain provider 270 may be omitted and each of the symbols transmitted by base station 102 may be transmitted with essentially the same gain.

As used herein, "processed symbols" means symbols generated for transmission by base station 102 or, as described below in connection with FIG. 8, by subscriber station 111 after being combined. For a particular embodiment, each processed symbol comprises an OFDM symbol sequence of N+G samples ($b_0, b_1, \ldots, b_{(N+G-1)}$). Thus, for the embodiment in which multiple gain provider 270 is implemented in base station 102, processed symbols are the symbols generated by multiple gain provider 270.

In another embodiment, multiple delay provider 265 introduces cyclic delays. Therefore, assume cyclic delay values on antenna 1 through antenna P for user m are $D_{m1}$, $D_{m2}$ and $D_{mP}$, respectively. The reception at the receiver appears like multi-path transmission from a single transmit antenna. The composite channel response on sub-carrier k, $H_{mc}(k)$, can then be written as:

$$H_{mc}(k) = H_{m0}(k) + H_{m1}(k) \cdot e^{-j2\pi k D_{m1}/N} + \ldots + H_{mP}(k) \cdot e^{-j2\pi k D_{mP}/N},$$

where $H_{mn}(k)$ is the channel response for user m on antenna n and k is the sub-carrier index. In this formulation, it is assumed that the complex antenna gains ($g_0, g_1, \ldots g_P$) are all unity.

Processed symbol transmitter 275 may be coupled to multiple gain provider 270 and is operable to transmit processed symbols from base station 102. For the embodiment in which multiple gain provider 270 is omitted, processed symbol transmitter 275 is coupled to multiple delay provider 265 instead of multiple gain provider 270. For a particular embodiment, processed symbol transmitter 275 is operable to provide each of the processed symbols to a different antenna in antenna array 255 through transceiver IF 245 and RF transceiver 250.

Figure 5:
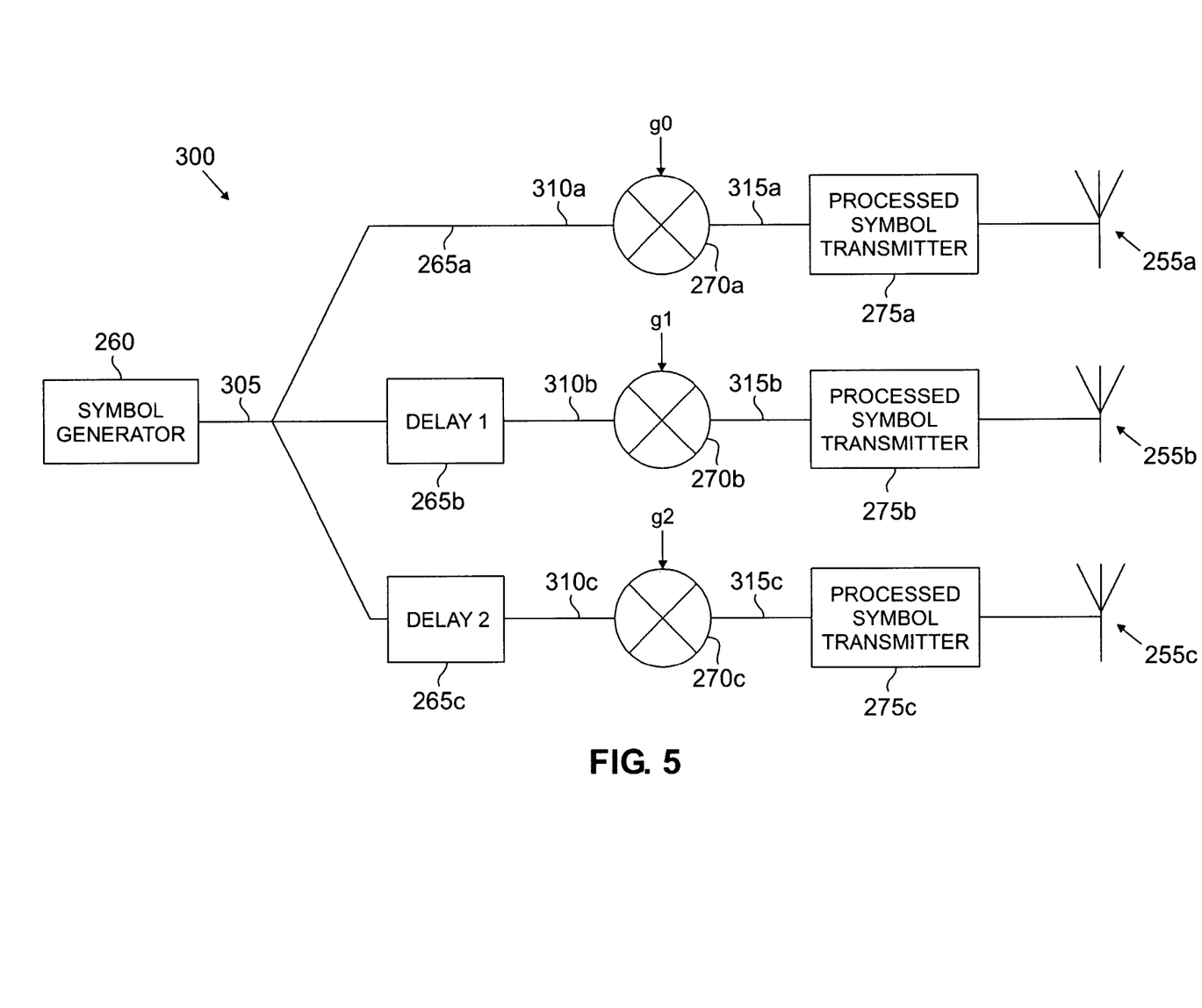
FIG. 5 illustrates an example of OFDM symbol processing in the base station of FIG. 4 according to an embodiment of the present disclosure.

FIG. 5 illustrates an example of OFDM symbol processing 300 in a base station, such as base station 102, according to an embodiment of the present disclosure. As described above in connection with FIG. 4, symbol generator 260 generates a symbol 305 for transmission from base station 102. The symbol 305 is provided to multiple delay provider 265, which provides a non-zero delay to generate a first delayed symbol 310a, Delay 1 to generate a second delayed symbol 310b, and Delay 2 to generate a third delayed symbol 310c. Although the illustrated embodiment shows multiple delay provider 265 generating three delayed symbols 310a-c, it will be understood that multiple delay provider 265 may generate any suitable number of delayed symbols 310 for each symbol 305 generated by symbol generator 260 without departing from the scope of the present disclosure.

Multiple delay provider 265 may provide the delayed symbols 310 to multiple gain provider 270, which generates a processed symbol 315 for each delayed symbol 310 by providing a different gain (g0, g1 and g2) for each delayed symbol 310. It will be understood that the processed symbols 315 are equivalent to the delayed symbols 310 for the embodiment in which multiple gain provider 270 is omitted. The processed symbols 315 are provided to processed symbol transmitter 275, which provides each processed symbol 315a-c to a different antenna in antenna array 255 for transmission. Thus, each processed symbol 315a-c is transmitted from an antenna 255a-c at a slightly different time, resulting in the processed symbols 315a-c being received at the receiver at slightly different times.

In the adaptive cyclic delay diversity scheme illustrated in FIG. 5, the delay values may be different for different users depending upon the user channel profile, velocity, and the like. For example, a large delay value may be chosen for a high-speed subscriber station 111-116 that may benefit from frequency-diversity 185, while a small delay value may be adopted for a low-speed subscriber station 111-116 that may potentially benefit from frequency-selective multi-user scheduling 180. Moreover, if the channel is already sufficiently frequency selective, a small delay value may be sufficient even for frequency-diversity mode transmission for high Doppler users.

Assuming that OFDM symbol processing 300 is provided by a transmitter with (P+1) transmit antennas 255, the cyclic delay values on antenna 1 through antenna P for user m are $D_{m1}$, $D_{m2}$ and $D_{mP}$, respectively. A non-delayed signal is transmitted from the first antenna, antenna 0 in this case ($D_{m0}=0$) (which corresponds to antenna 255a in FIG. 5). In a more general form, different complex gains ($g_0, g_1, \ldots g_P$) may also be applied to signals transmitted from different transmit antennas 255. The transmission of the same OFDM symbol from different antennas 255 allows the artificial injection of frequency-selective fading. The frequency-selectivity may then be exploited by either using frequency-selective multi-user scheduling 180 for low-to-medium subscriber station speeds or frequency-diversity 185 for higher subscriber station speeds.

By using adaptive cyclic delay diversity (ACDD), the reception at the receiver appears like multi-path transmission from a single transmit antenna. The composite channel response on sub-carrier k, $H_{mc}(k)$, may be written as:

$$H_{mc}(k) = H_{m0}(k) + H_{m1}(k) \cdot e^{-j2\pi k D_{m1}/N} + \ldots + H_{mp}(k) \cdot e^{-j2\pi k D_{mp}/N},$$

where $H_{mn}(k)$ is the channel response for user m on antenna n and k is the sub-carrier index. In this formulation, it is assumed that the complex antenna gains ($g_0, g_1, \ldots g_P$) are all unity.

In the frequency domain, ACDD may be implemented by applying the equivalent phase shift ($e^{-j2\pi k D_m/N}$) corresponding to a certain delay $D_m$ on the $m^{th}$ antenna to the signal S(k), $$S_m(k) = S(k) \cdot e^{-j2\pi k D_m/N},$$

An advantage of doing ACDD in the frequency domain is that only M (number of antennas) FFT blocks instead of K (number of users) FFT blocks are used.

Figure 6:
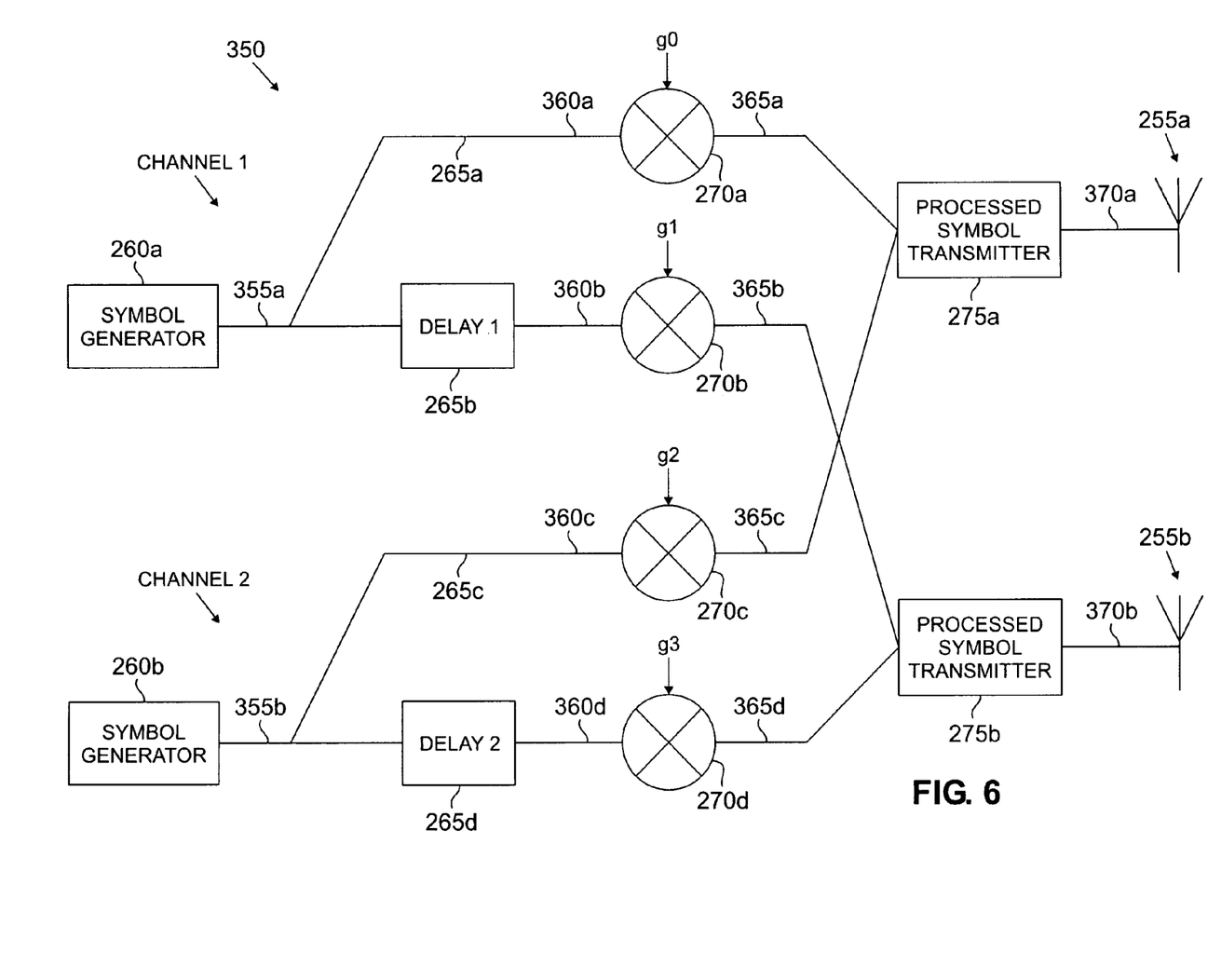
FIG. 6 illustrates an example of OFDM symbol processing in the base station of FIG. 4 according to another embodiment of the present disclosure.

FIG. 6 illustrates an example of OFDM symbol processing 350 in a base station, such as base station 102, according to an embodiment of the present disclosure. For this embodiment, OFDM symbol processing 350 is performed for transmission on two different channels.

As illustrated in FIG. 6, the OFDM symbols 355 are generated and processed separately for different channels in this embodiment. For this example, channel 1 uses a first delay, Delay 1, and channel 2 uses a second delay, Delay 2. The samples (365a and 365c, 365b and 365d) from the two OFDM symbols generated separately are added together for each transmit antenna 255a and 255b separately before transmission. The two channels may be allocated to two different users' transmissions. Moreover, channel 1 may carry control information while channel 2 carries the traffic.

Figure 7:
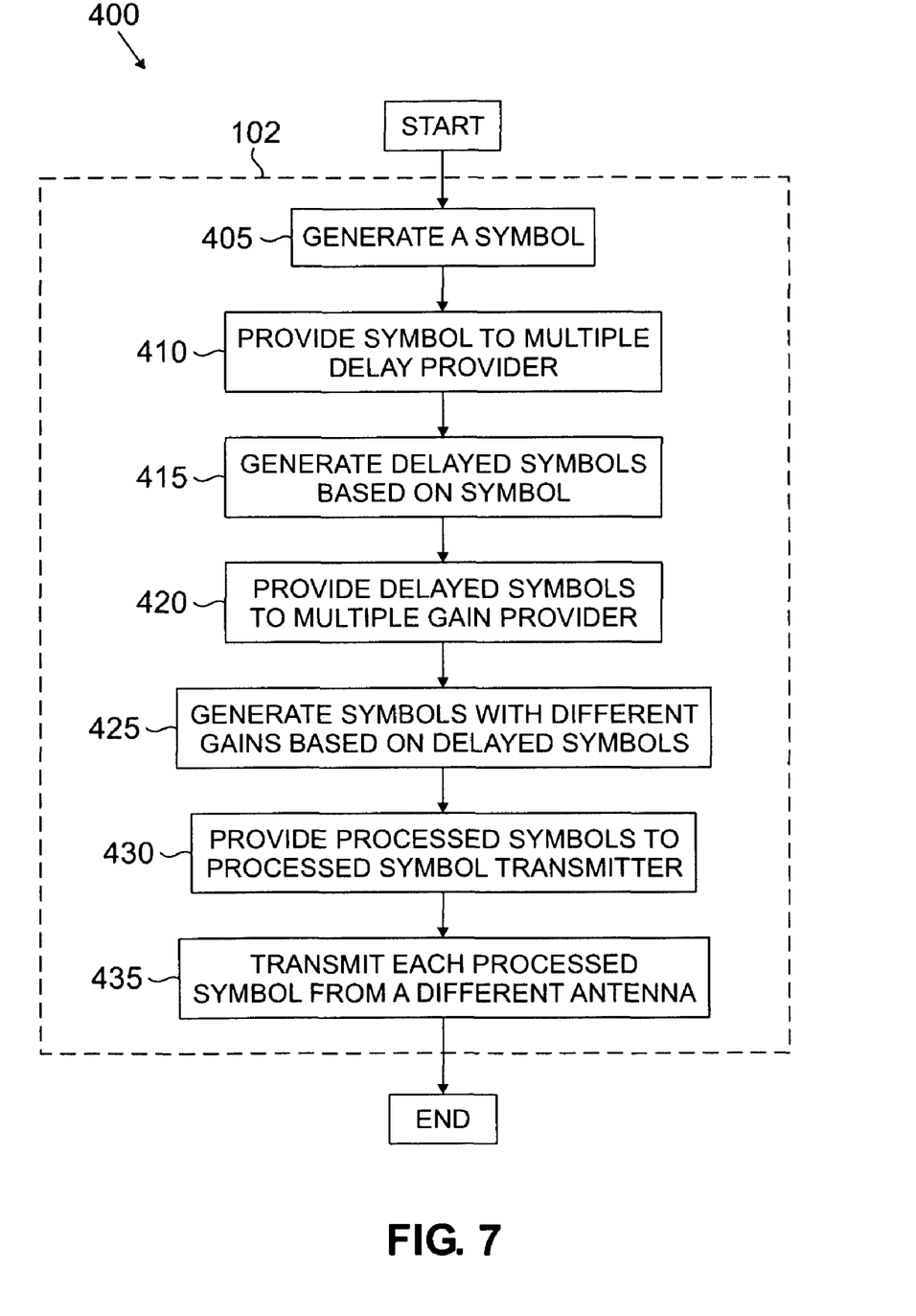
FIG. 7 is a flow diagram illustrating a method for introducing frequency selectivity into transmissions from the base station of FIG. 4 according to an embodiment of the present disclosure.

FIG. 7 is a flow diagram illustrating a method 400 for introducing frequency selectivity into transmissions from base station 102 according to an embodiment of the present disclosure. Although the method is described with respect to base station 102, it will be understood that the method may be performed by any suitable base station in network 100, such as base station 103. In addition, the method is described with respect to transmitting a single symbol; however, it will be understood that the process is repeated for each symbol to be transmitted.

Initially, symbol generator 260 generates a symbol 305 to be transmitted (process step 405). For a particular embodiment, symbol generator 260 generates the symbol 305 by generating an OFDM symbol sequence that comprises N+G samples, with N samples from the output of an IFFT and G samples of a cyclic prefix. Symbol generator 260 then provides the symbol 305 to multiple delay provider 265 (process step 410).

Multiple delay provider 265 generates a plurality of delayed symbols 310 based on the symbol 305 received from symbol generator 260 (process step 415) and provides the delayed symbols 310 to multiple gain provider 270, if multiple gain provider 270 is implemented in base station 102 (process step 420).

Multiple gain provider 270 then generates a plurality of symbols 315 with different gains based on the delayed symbols 310 (process step 425) and provides these processed symbols 315 to processed symbol transmitter 275 (process step 430). For the embodiment in which multiple gain provider 270 is omitted, it will be understood that multiple delay provider 265 provides the processed symbols 315, which are equivalent to the delayed symbols 310, to processed symbol transmitter 275 (process step 430). In addition, for this embodiment, process steps 420 and 425 are omitted. Finally, each processed symbol 315 is transmitted from a different antenna in antenna array 255 when received from processed symbol transmitter 275 such that each processed symbol 315 is transmitted at a slightly different time (process step 435).

In this way, base station 102 may introduce frequency selectivity into otherwise flat-fading transmissions from the base station 102. Thus, the transmitted symbols 315 will arrive at the receiver, such as one of the subscriber stations 111-116, at multiple times as would a symbol received with inherent frequency selectivity. This allows frequency selectivity to be fully exploited, greatly improving the capacity and reliability of the wireless channel.

Figure 8:
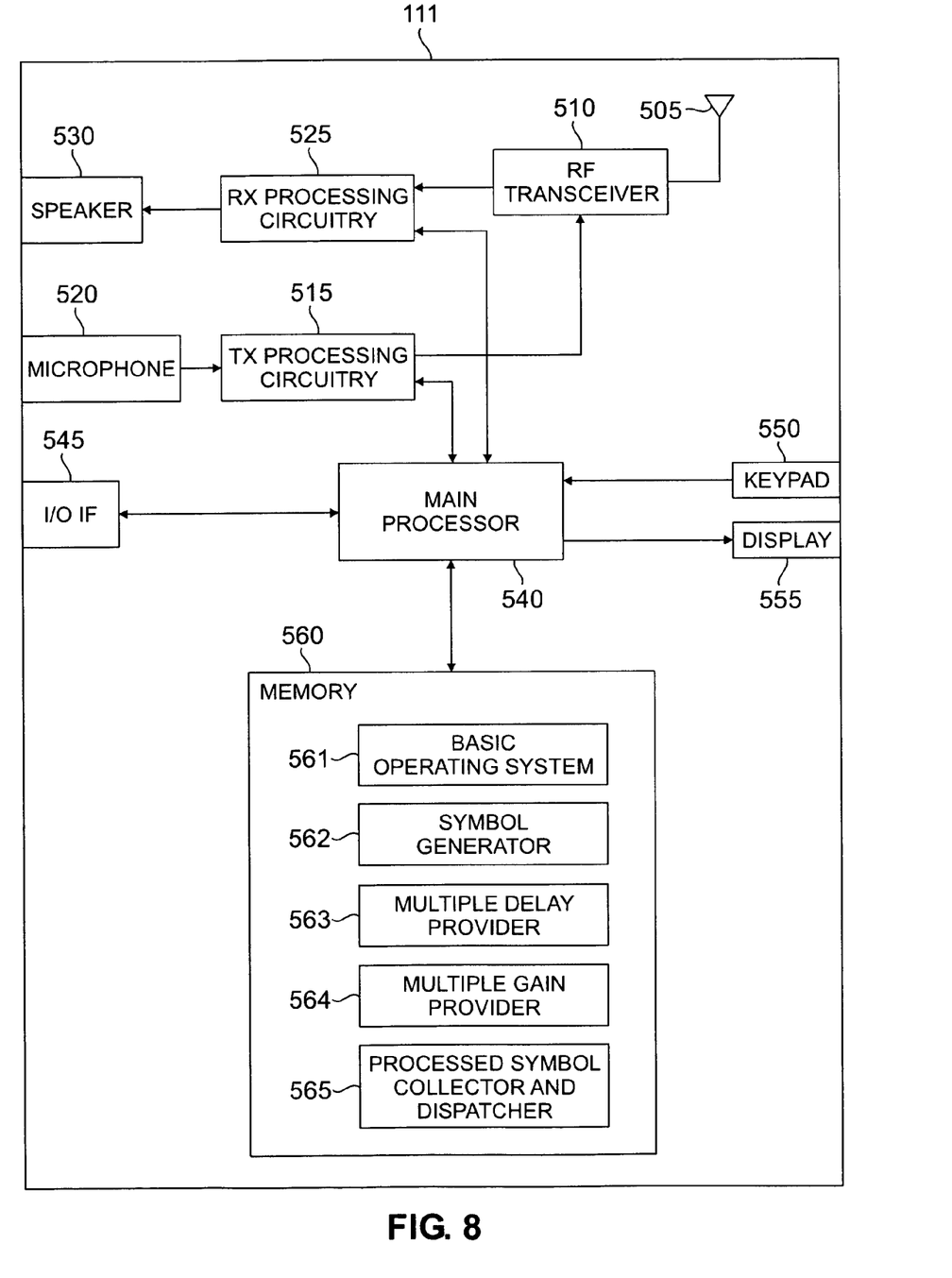
FIG. 8 illustrates an exemplary subscriber station that is capable of introducing frequency selectivity into transmissions according to an embodiment of the present disclosure.

FIG. 8 illustrates wireless subscriber station 111 according to an advantageous embodiment of the present disclosure. Wireless subscriber station 111 comprises antenna array 505, radio frequency (RF) transceiver 510, transmit (TX) processing circuitry 515, microphone 520, and receive (RX) processing circuitry 525. MS 111 also comprises speaker 530, main processor 540, input/output (I/O) interface (IF) 545, keypad 550, display 555, and memory 560. Memory 560 further comprises basic operating system (OS) program 561, symbol generator 562, multiple delay provider 563, optional multiple gain provider 564, and processed symbol collector and dispatcher 565.

Radio frequency (RF) transceiver 510 receives from antenna array 505 an incoming RF signal transmitted by a base station of wireless network 100. Radio frequency (RF)

transceiver 510 down-converts the incoming RF signal to produce an intermediate frequency (IF) or a baseband signal. The IF or baseband signal is sent to receiver (RX) processing circuitry 525 that produces a processed baseband signal by filtering, decoding, and/or digitizing the baseband or IF signal. Receiver (RX) processing circuitry 525 transmits the processed baseband signal to speaker 530 (i.e., voice data) or to main processor 540 for further processing (e.g., web browsing).

Transmitter (TX) processing circuitry 515 receives analog or digital voice data from microphone 520 or other outgoing baseband data (e.g., web data, e-mail, interactive video game data) from main processor 540. Transmitter (TX) processing circuitry 515 encodes, multiplexes, and/or digitizes the outgoing baseband data to produce a processed baseband or IF signal. Radio frequency (RF) transceiver 510 receives the outgoing processed baseband or IF signal from transmitter (TX) processing circuitry 515. Radio frequency (RF) transceiver 510 up-converts the baseband or IF signal to a radio frequency (RF) signal that is transmitted via antenna array 505.

In an advantageous embodiment of the present disclosure, main processor 540 is a microprocessor or microcontroller. Memory 560 is coupled to main processor 540. According to an advantageous embodiment of the present disclosure, part of memory 560 comprises a random access memory (RAM) and another part of memory 560 comprises a non-volatile memory, such as Flash memory, which acts as a read-only memory (ROM).

Main processor 540 executes basic operating system (OS) program 561 stored in memory 560 in order to control the overall operation of wireless subscriber station 111. In one such operation, main processor 540 controls the reception of forward channel signals and the transmission of reverse channel signals by radio frequency (RF) transceiver 510, receiver (RX) processing circuitry 525, and transmitter (TX) processing circuitry 515, in accordance with well-known principles.

Main processor 540 is also operable to execute symbol generator 562, multiple delay provider 563, multiple gain provider 564, and processed symbol collector and dispatcher 565. Although illustrated and described separately, it will be understood that any combination of two or more of symbol generator 562, multiple delay provider 563, multiple gain provider 564, and processed symbol collector and dispatcher 565 may be implemented together in a single application without departing from the scope of the present disclosure.

Symbol generator 562 is operable to generate symbols for transmission by subscriber station 111. For a particular embodiment, each symbol comprises an OFDM symbol sequence of N+G samples ($a_0, a_1, \ldots, a_{(N+G-1)}$), with N samples corresponding to the output of an IFFT and G samples corresponding to a cyclic prefix for the symbol. Symbol generator is also operable to provide the symbols to multiple delay provider 563.

Multiple delay provider 563 is operable to provide a plurality of delays for each symbol generated by symbol generator 562 in order to generate a plurality of delayed symbols based on each symbol. The maximum delay provided by multiple delay provider 563 may be less than the cyclic prefix length in order to avoid inter-symbol interference. Alternatively, multiple delay provider 563 may introduce cyclic delays, in which case the cyclic delay may be larger than the cyclic prefix length without introducing inter-symbol interference. Multiple delay provider 563 is also operable to provide the delayed symbols to multiple gain provider 564 or, for the embodiment in which multiple gain provider 564 is omitted, to processed symbol collector and dispatcher 565.

For one embodiment, one of the delayed symbols may have a delay of essentially zero. For this embodiment, multiple delay provider 563 provides the delayed symbol having a delay of essentially zero directly to multiple gain provider 564, or to processed symbol collector and dispatcher 565, without intentionally delaying the symbol.

For one embodiment, multiple delay provider 563 may provide the multiple delays for each symbol by shifting the symbol to be delayed by an integer number of samples. For another embodiment, multiple delay provider 563 may provide the multiple delays for each symbol by shifting the symbol to be delayed by a fraction of a sample delay by over-sampling the symbol by a factor of Q, resulting in a Q times higher sampling rate. An integer number of higher rate sample delay may then be introduced. In this embodiment, each of the higher rate samples will introduce a delay of 1/Qth of the original sample delay.

Multiple gain provider 564 is operable to provide a plurality of gains, with a different gain for each delayed symbol generated by multiple delay provider 563, in order to generate a plurality of processed symbols. For one embodiment, multiple gain provider 564 may be omitted and each of the symbols transmitted by subscriber station 111 may be transmitted with essentially the same gain.

For a particular embodiment, each processed symbol comprises an OFDM symbol sequence of N+G samples ($b_0, b_1, \ldots, b_{(N+G-1)}$). Thus, for the embodiment in which multiple gain provider 564 is implemented in subscriber station 111, processed symbols are the symbols generated by multiple gain provider 564.

Processed symbol collector and dispatcher 565 is operable to collect and dispatch the processed symbols received from multiple gain provider 564 or multiple delay provider 563 that are based on a single symbol generated by symbol generator 562. Processed symbol collector and dispatcher 565 is also operable to provide the processed symbols to main processor 540 for transmission from antenna array 505, which comprises multiple transmit antennas, of subscriber station 111.

Main processor 540 is capable of executing other processes and programs resident in memory 560. Main processor 540 can move data into or out of memory 560, as required by an executing process. Main processor 540 is also coupled to I/O interface 545. I/O interface 545 provides subscriber station 111 with the ability to connect to other devices such as laptop computers and handheld computers. I/O interface 545 is the communication path between these accessories and main controller 540.

Main processor 540 is also coupled to keypad 550 and display unit 555. The operator of subscriber station 111 uses keypad 550 to enter data into subscriber station 111. Display 555 may be a liquid crystal display capable of rendering text and/or at least limited graphics from web sites. Alternate embodiments may use other types of displays.

Figure 9:
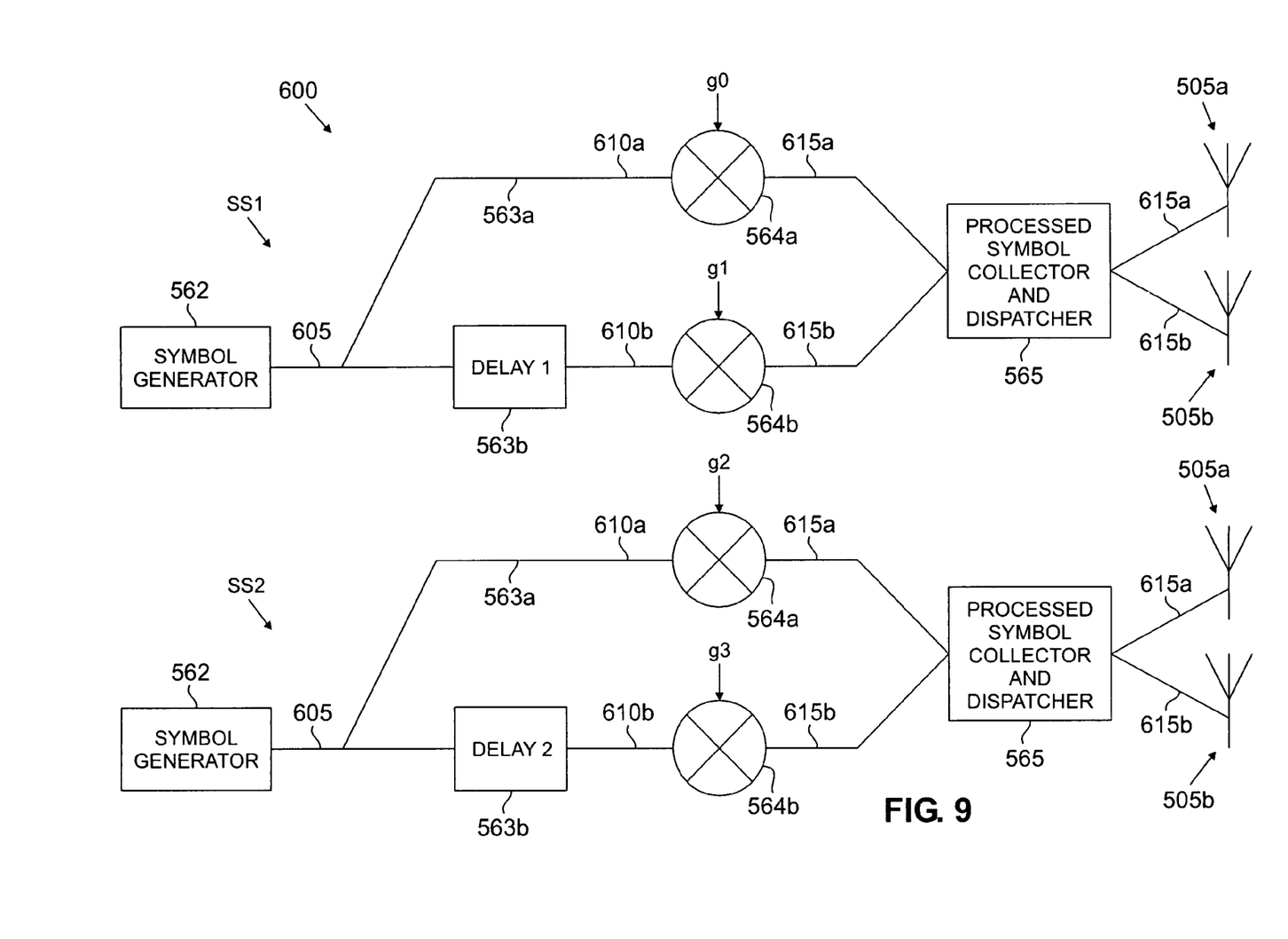
FIG. 9 illustrates an example of OFDM symbol processing in the subscriber station of FIG. 8 according to an embodiment of the present disclosure.

FIG. 9 illustrates an example of OFDM symbol processing 600 in two subscriber stations (SS1 and SS2), such as two of subscriber stations 111-116, according to an embodiment of the present disclosure. As described above in connection with FIG. 8, symbol generator 562 generates a symbol 605 for transmission from the first subscriber station (SS1). The symbol 605 is provided to multiple delay provider 563, which provides a non-zero delay to generate a first delayed symbol 610a and Delay 1 to generate a second delayed symbol 610b. Although the illustrated embodiment shows multiple delay provider 563 generating two delayed symbols 610a-b, it will be understood that multiple delay provider 563 may generate any suitable number of delayed symbols 610 for each symbol 605 generated by symbol generator 562 without departing from the scope of the present disclosure.

Multiple delay provider 563 may provide the delayed symbols 610 to multiple gain provider 564, which generates a processed symbol 615 for each delayed symbol 610 by providing a different gain (g0 and g1) for each delayed symbol 610. It will be understood that the processed symbols 615 are equivalent to the delayed symbols 610 for the embodiment in which multiple gain provider 564 is omitted. The processed symbols 615a-b are provided to processed symbol collector and dispatcher 565, which collects the processed symbols 615a-b and dispatches the processed symbols 615a-b to antenna array 505 of SS1.

Similarly, symbol generator 562 generates a symbol 605 for transmission from the second subscriber station (SS2). The symbol 605 is provided to multiple delay provider 563, which provides a non-zero delay to generate a first delayed symbol 610a and Delay 2, which is independent of Delay 1 provided by multiple delay provider 563 of SS1, to generate a second delayed symbol 610b. Multiple delay provider 563 may provide the delayed symbols 610 to multiple gain provider 564, which generates a processed symbol 615 for each delayed symbol 610 by providing a different gain (g2 and g3, which are independent of g0 and g1 provided by multiple gain provider 564 of SS1) for each delayed symbol 610. The processed symbols 615a-b are provided to processed symbol collector and dispatcher 565, which collects the processed symbols 615a-b and dispatches the processed symbols 615a-b to antenna array 505 of SS2.

Figure 10:
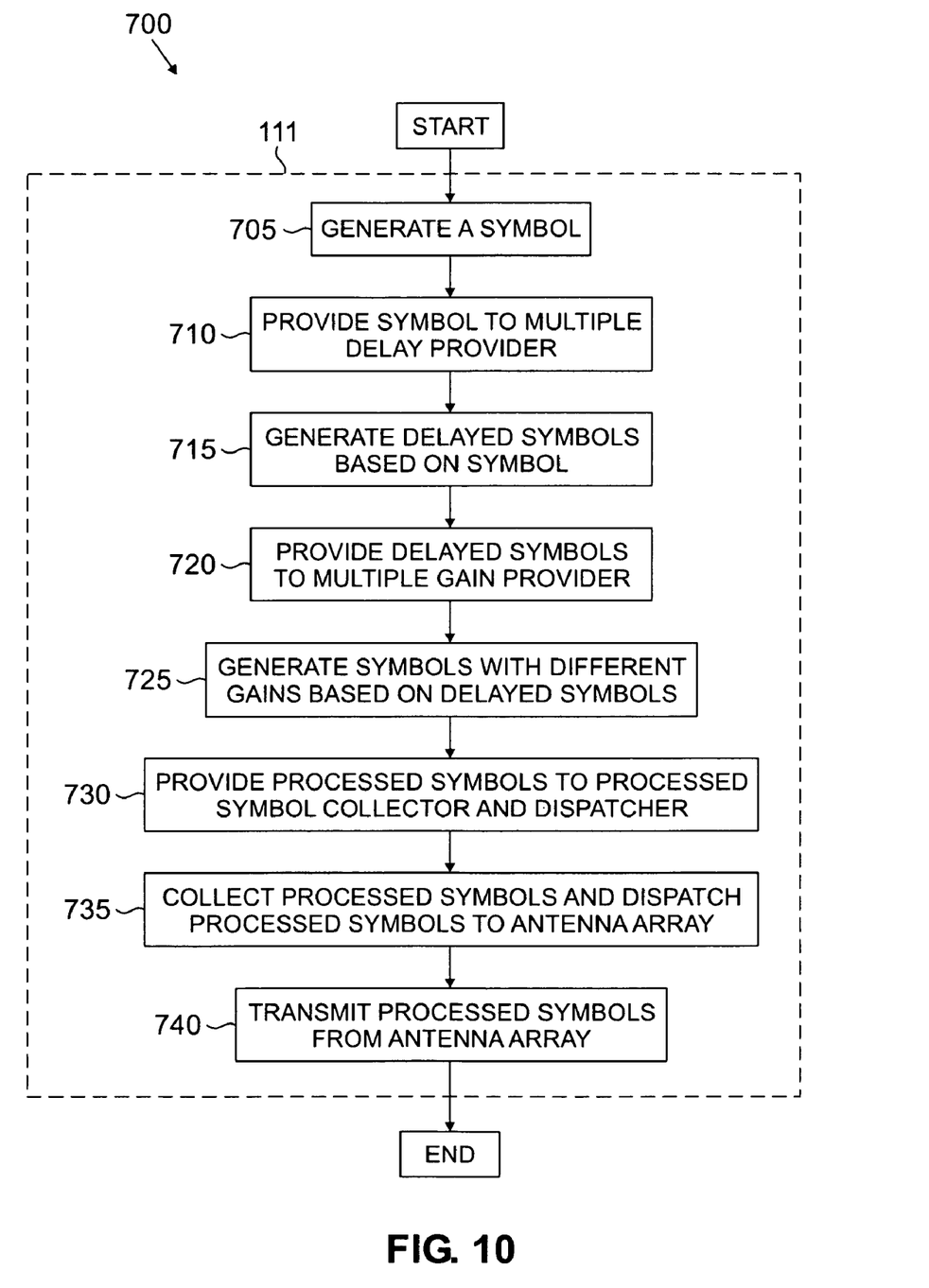
FIG. 10 is a flow diagram illustrating a method for introducing frequency selectivity into transmissions from the subscriber station of FIG. 8 according to an embodiment of the present disclosure.

FIG. 10 is a flow diagram illustrating a method 700 for introducing frequency selectivity into transmissions from a subscriber station 111 according to an embodiment of the present disclosure. Although the method is described with respect to subscriber station 111, it will be understood that the method may be performed by any suitable subscriber station in network 100, such as one of subscriber stations 112-116. In addition, the method is described with respect to transmitting a single symbol; however, it will be understood that the process is repeated for each symbol to be transmitted.

Initially, symbol generator 562 generates a symbol 605 to be transmitted (process step 705). For a particular embodiment, symbol generator 562 generates the symbol 605 by generating an OFDM symbol sequence that comprises N+G samples, with N samples from the output of an IFFT and G samples of a cyclic prefix. Symbol generator 562 then provides the symbol 605 to multiple delay provider 563 (process step 710).

Multiple delay provider 563 generates a plurality of delayed symbols 610 based on the symbol 605 received from symbol generator 562 (process step 715) and provides the delayed symbols 610 to multiple gain provider 564, if multiple gain provider 564 is implemented in subscriber station 111 (process step 720).

Multiple gain provider 564 then generates a plurality of symbols 615 with different gains based on the delayed symbols 610 (process step 725) and provides these processed symbols 615 to processed symbol collector and dispatcher 565 (process step 730). For the embodiment in which multiple gain provider 564 is omitted, it will be understood that multiple delay provider 563 provides the processed symbols 615, which are equivalent to the delayed symbols 610, to processed symbol collector and dispatcher 565 (process step 730). In addition, for this embodiment, process steps 720 and 725 are omitted.

Processed symbol collector and dispatcher 565 collects the processed symbols 615 and dispatches the processed symbols 615 to multiple transmit antennas in antenna array 505 (process step 735). Finally, the processed symbols 615 are transmitted from multiple antenna array 505 of subscriber station 111 (process step 740).

In this way, subscriber station 111 may introduce frequency selectivity into otherwise flat-fading transmissions from the subscriber station 111. Thus, the transmitted signal will arrive at the receiver, such as base station 102, as would a symbol received with inherent frequency selectivity. This allows frequency selectivity to be fully exploited, greatly improving the capacity and reliability of the wireless channel.

In wireless transmission, the time is generally divided into fixed-length time frames. A frame in Evolved UTRA (UMTS Terrestrial Radio Access), for example, is 10 ms long. The 10 ms frame is further divided into 20 time slots. Multiple OFDM symbols may potentially be transmitted within one slot. For example, one slot may comprise four OFDM symbols. According to the principles of the present disclosure, the OFDM symbol processing (i.e., relative delays D1, D2, . . . , DP and gains $g_0, g_1, \ldots g_p$) may be changed on a frame-by-frame basis, a slot-by-slot basis or an OFDM-symbol-by-symbol basis. It is also possible to keep the OFDM symbol processing parameters unchanged over multiple frames. The decision on how often the symbol processing parameters are changed may be based on the user channel type and/or other suitable criteria. Also, different subscriber stations 111-116 or different channels multiplexed using OFDMA may use different frequencies for changing OFDM symbol processing parameters.

In some cases, a time division multiplexing preamble structure may be used for synchronization, channel estimation and the like, where a first OFDM symbol within a frame or slot carries the pilot information. In this case, the OFDM symbol processing parameters, such as relative delays and gains, are changed only after a new preamble using the new set of parameters is available. Pilots or preambles used for channel estimation and hence demodulation/decoding of the data symbols generally use the same OFDM symbol processing parameters as the OFDM symbols carrying the data symbols.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of introducing frequency selectivity into transmissions in an orthogonal frequency division multiplexing (OFDM) network, the method comprising:

receiving a symbol;

generating a plurality of cyclic delay symbols associated with the received symbol, each of the plurality of cyclic delay symbols having a different delay based at least partly upon a channel characteristic of a channel on which the cyclic delay symbol is to be transmitted, wherein for each cyclic delay symbol, a larger delay is selected to promote frequency diversity and a smaller delay is selected to promote frequency selective scheduling;

transmitting each of the plurality of cyclic delay symbols from a different antenna of an antenna array by a processed symbol transmitter, wherein for each cyclic delay symbol, a larger delay is selected when the cyclic delay symbol is transmitted to a high mobility user and a smaller delay is selected when the cyclic delay symbol is transmitted to a low mobility user; and generating a processed symbol for each cyclic delay symbol by providing a different gain for each cyclic delay symbol.

2. The method as set forth in claim 1, wherein transmitting the cyclic delay symbols comprises transmitting each processed symbol from a different antenna.

3. The method as set forth in claim 1, wherein the symbol comprises an OFDM symbol sequence comprising a number of samples based on a size of an Inverse Fast Fourier Transform and a size of a cyclic prefix.

4. For use in an orthogonal frequency division multiplexing (OFDM) network, a base station capable of introducing frequency selectivity into transmissions, the base station comprising:

a symbol generator configured to generate a symbol; and a multiple delay provider coupled to the symbol generator, the multiple delay provider configured to generate a plurality of cyclic delay symbols associated with the symbol, each of the plurality of cyclic delay symbols having a different delay based at least partly upon a channel characteristic of a channel on which the cyclic delay symbol is to be transmitted, wherein for each cyclic delay symbol, a larger delay is selected to promote frequency diversity and a smaller delay is selected to promote frequency selective scheduling;

an antenna array comprising a plurality of antennas;

a processed symbol transmitter coupled to the multiple delay provider, the processed symbol transmitter configured to provide each of the plurality of cyclic delay symbols to a different antenna of the antenna array, wherein for each cyclic delay symbol, a larger delay is selected when the cyclic delay symbol is transmitted to a high mobility user and a smaller delay is selected when the cyclic delay symbol is transmitted to a low mobility user; and a multiple gain provider coupled to the multiple delay provider, the multiple gain provider configured to generate a processed symbol for each cyclic delay symbol by providing a different gain for each cyclic delay symbol.

5. The base station as set forth in claim 4, wherein each antenna is configured to transmit the cyclic delay symbols provided by the processed symbol transmitter.

6. The base station as set forth in claim 4, wherein the processed symbol transmitter is configured to provide the processed symbols to the antenna array by providing each of the processed symbols to a different antenna of the antenna array, and each antenna is configured to transmit the processed symbol provided by the processed symbol transmitter.

7. The base station as set forth in claim 4, wherein the symbol comprises an OFDM symbol sequence comprising a number of samples based on a size of an Inverse Fast Fourier Transform and a size of a cyclic prefix.

8. For use in an orthogonal frequency division multiplexing (OFDM) network, a subscriber station capable of introducing frequency selectivity into transmissions, the subscriber station comprising:

a memory configured to store a symbol generator and a multiple delay provider, the symbol generator configured to generate a symbol and the multiple delay provider configured to generate a plurality of cyclic delay symbols associated with the symbol, each of the plurality of cyclic delay symbols having a different delay based at least partly upon a channel characteristic of a channel on which the cyclic delay symbol is to be transmitted, wherein for each cyclic delay symbol, a larger delay is selected to promote frequency diversity and a smaller delay is selected to promote frequency selective scheduling; and a processed symbol transmitter configured to transmit at least one of the plurality of symbols, wherein for each cyclic delay symbol, a larger delay is selected when the cyclic delay symbol is associated with a high mobility subscriber station and a smaller delay is selected when the cyclic delay symbol is associated with a low mobility subscriber station, wherein the memory further is configured to store a multiple gain provider, and the multiple gain provider is configured to generate a processed symbol for each cyclic delay symbol by providing a different gain for each cyclic delay symbol.

9. The subscriber station as set forth in claim 8, wherein the memory further is configured to store a processed symbol collector and dispatcher, and the processed symbol collector and dispatcher are configured to collect the cyclic delay symbols.

10. The subscriber station as set forth in claim 9, further comprising a multiple antenna array, wherein the processed symbol collector and dispatcher further are configured to dispatch the cyclic delay symbols to the multiple antenna array, and the multiple antenna array is configured to transmit the cyclic delay symbols.

11. The subscriber station as set forth in claim 10, wherein the processed symbol collector and dispatcher further are configured to dispatch each of the plurality of cyclic delay symbols to a different antenna of the multiple antenna array.

12. The subscriber station as set forth in claim 8, wherein the memory further is configured to store a processed symbol collector and dispatcher, and the processed symbol collector and dispatcher are configured to collect the processed symbols.

13. The subscriber station as set forth in claim 12, further comprising a multiple antenna array, wherein the processed symbol collector and dispatcher further are configured to dispatch the processed symbols to the multiple antenna array, and the multiple antenna array is configured to transmit the processed symbols.

14. The subscriber station as set forth in claim 8, wherein the symbol comprises an OFDM symbol sequence comprising a number of samples based on a size of an Inverse Fast Fourier Transform and a size of a cyclic prefix.

* * * * *